A. F. C. GARBEN.
HOBBY HORSE.
No. 542,850.  Patented July 16, 1895.
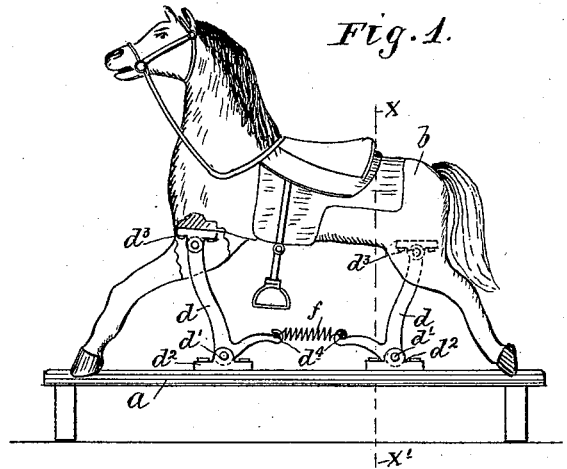
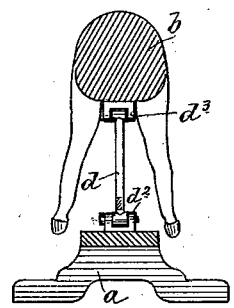
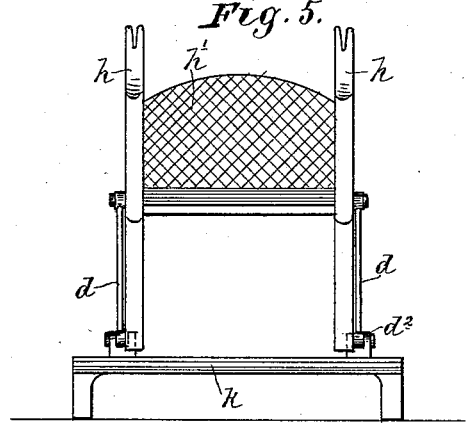
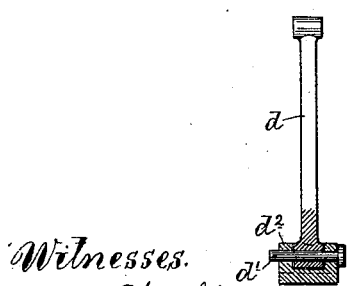
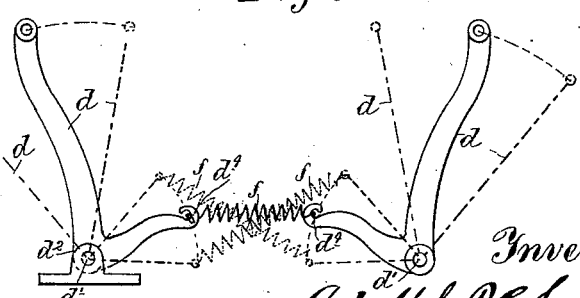
Witnesses.
A. H. Opsahl.
E. Felice Elmore.
Inventor.
Adolph F. C. Garben
By his Attorney.
Jas. P. Williamson

UNITED STATES PATENT OFFICE.

ADOLPH F. C. GARBEN, OF CHICAGO, ILLINOIS.

HOBBY-HORSE.

SPECIFICATION forming part of Letters Patent No. 542,850, dated July 16, 1895.

Application filed March 10, 1894. Serial No. 503,085. (No model.)

*To all whom it may concern:*

Be it known that I, ADOLPH F. C. GARBEN, a citizen of the United States, residing at Chicago, in the county of Cook and State of Illinois, have invented certain new and useful Improvements in Hobby-Horses; and I do hereby declare the following to be a full, clear, and exact description of the invention, such as will enable others skilled in the art to which it appertains to make and use the same.

My invention has for its object to provide an easy-riding swing-motion hobby-horse.

To this end the invention consists of certain novel devices and combinations of devices, which will be hereinafter described and be defined in the claims.

The invention is illustrated in the accompanying drawings, wherein, like letters referring to like parts throughout the several views—

Figure 1 is a side elevation of a hobby-horse constructed and mounted in accordance with my invention. Fig. 2 is a vertical cross-section on the line X X' of Fig. 1. Fig. 3 is a skeleton view, in front elevation, showing the relation and action of the bell-crank levers and the springs which support and control the motion of the horse detached. Fig. 4 is a detail, in front elevation, of one of the bell-crank levers detached, with a portion thereof shown in vertical section. Fig. 5 is a front view of a modification wherein my improvement is shown as applied to a double hobby with the seat between the two horses.

$a$ represents a base of support, which may be of any suitable construction.

$b$ represents the horse body or hobby proper.

$d$ represents bell-crank levers applied one under each end of the horse or on opposite sides of the longitudinal center thereof, and preferably in line with each other. These bell-crank levers have their elbows pivoted, as shown at $d'$, to bearing-lugs $d^2$ fixed to the base of support. The upper or long arms of the said bell-crank levers are pivoted to bearing-lugs $d^3$ fixed to the horse-body in the longitudinal central line thereof, preferably between the legs of the horse. The said bell-crank levers are preferably set with their lower or short arms facing each other and connected by a coiled spring $f$. For the convenient attachment and removal of this spring $f$ the short arms of said levers are provided with hook-like extremities $d^4$, which are engaged by the terminals or eyes of the said spring $f$. The said bell-crank levers are preferably made of curvilinear form or outline, so as to be pleasing to the eye, and in virtue of their points of attachment, the motion thereof will be somewhat similar to the natural motion of the horse's legs. Having regard to the action, it is obvious, as may be seen by reference to Fig. 3, that the horse or hobby is capable of a rocking motion on the said bell-crank levers, and that this motion will be yieldingly resisted and limited in both directions by the said spring $f$, in virtue of its relation to the said bell-crank levers and the pivotal points of attachment of the said levers to the said base of support $a$. Otherwise stated, the forward and backward rocking motion of the horse is spring-cushioned in each direction. The result is that an extremely easy motion is imparted to the horse hobby or body under the swaying impulses imparted by the child. When applied to a single horse, adapted to carry the child on its back, as shown in Figs. 1, 2, 3, and 4, only a single pair of the said bell-crank levers is required, but to get the same action from a hobby-horse team, such as is shown in Fig. 5, with the horses $h$ at the sides and the child's seat $h'$ between the two, four of the said levers $d$ are required, working in two pairs of front and rear members, applied to each of the said horses on the outermost sides of the same, as clearly shown in Fig. 5; and, of course, the base of support $k$ is correspondingly broadened, as required for the double horse of this kind. Otherwise the action is exactly similar to that shown in Figs. 1, 2, 3, and 4.

It will, of course, be understood that the parts might be modified in arrangement and construction to a considerable extent without departing from the principle of my invention. In a broad point of view, all that is necessary to the action is a pivoted lever on which the horse is mounted and one or more springs applied to yieldingly resist and limit the forward and backward pivotal or rocking motion of said horse or hobby in both directions. It would be possible to get this result, though not so perfectly, with a single pivoted lever, provided springs be properly applied thereto or to the horse for yieldingly resisting and limiting the pivotal motion. It is even much more obvious that the bell-crank levers might be set with their short arms facing in the reverse direction from that shown or with one facing in one direction and the other in another direction, provided separate springs were employed and these were applied to connect the short arms to the base of support.

A very important and peculiar action which follows from my arrangement of the pivoted levers and their retracting and cushioning spring should be noted. The springs are applied to the levers in such manner that when the horse or hobby is in its normal position or at rest the line of strain of said springs will be in close proximity to the dead-center through their points of attachment and the pivots of the levers. When the hobby is rocked, the ends of the bell-crank levers to which the spring is attached is moved away from the dead-center, to increase the power of said lever, a distance dependent on the amount of movement given to the hobby. From this it follows that the rocking motions of the hobby are controlled by a yielding strain which is increased at the extremes of its reciprocations not only by the increased tension of the spring, but also by the more rapidly-increasing power of said levers. It will thus be seen that the hobby may be easily moved near its normal or resting position, while the extremes of its movement are limited by a cushion which increases in substantially a geometrical ratio.

Again, as the hobby-horse is supported from its opposite ends, the weight of the rider, under the to-and-fro motion of the hobby, will be carried and sustained within the limits of vertical lines drawn through the supporting-pivots of the bell-crank levers. Obviously this latter feature of construction is of great importance, as the weight of the hobby and rider after passing the vertical lines through the said supporting-pivots would have an increased leverage action, which would greatly diminish the efficiency of the retracting-springs.

The construction and arrangement shown, however, is by far the best, on account of simplicity, economy, action, and appearance. With this construction the horse is not only a very easy riding one, but in the arrangement and motion of the parts there is nothing in violent contrast or out of harmony with the natural motion of the horse. The imitation is therefore a natural and pleasing one both to the observer and to the rider.

What I claim, and desire to secure by Letters Patent of the United States, is as follows:

1. The combination with a hobby-horse or other body, and a base of support, of bell-crank levers, located one or more under each end of said body, with their lower arms facing each other, their elbows pivoted to said support, and their upper arms pivoted to the hobby and a spring or springs connecting the lower and facing arms of said levers, substantially as and for the purposes set forth.

2. The combination with a base of support, as $a$, of the hobby-horse $b$, the bell-crank levers $d$, located, one under each end of the horse, with their elbows pivoted to said support, their lower or short arms facing each other and provided with hooked extremities and their upper arms pivoted between the legs of the horse, and the coiled spring $f$ detachably connecting the short arms of said lever, substantially as and for the purpose set forth.

In testimony whereof I affix my signature in presence of two witnesses.

ADOLPH F. C. GARBEN.

Witnesses:
JAS. F. WILLIAMSON,
FRANK D. MERCHANT.